United States Patent Office 2,773,330
Patented Dec. 11, 1956

2,773,330

SOIL CONDITIONER

Richard C. Erwin, Mountain View, Calif., assignor to Stauffer Chemical Company, a corporation of Delaware No Drawing. Application October 27, 1954,
Serial No. 465,149

7 Claims. (Cl. 47—58)

This invention relates to certain soil conditioning compounds. So-called soil conditioners have been proposed in the past, but such conditioners have not been true soil conditioners but, in general, could be better characterized as soil stabilizers, since they maintain the soil substantially in the condition in which it is at the time the stabilizer is applied. In other words, such conditioners, to be effective, must be applied to soil when it is in a good condition of tilth, and such conditioners are very helpful in maintaining that condition. On the other hand, the compounds of the present invention are true soil conditioners inasmuch as they can be applied to soil in very poor physical condition and bring about a remarkable change in the physical condition.

Some of the soil conditioners which have been proposed in the past have also been applicable only to certain types of soil. Thus, such conditioners were not universal in application, but would prove advantageous in some types of soil and almost worthless in others. Further, such conditioners were not universally applicable to both acid and alkaline soils. By contrast, it has been found that the conditioners of the present invention are advantageous when used in any type of soil. Surprisingly enough, it has been found that the conditioners of the present invention tend to neutralize the soil so that the soil will have an ultimate pH of about 7 and this regardless of whether the original starting soil was acid or basic. Thus, the soil conditioner of the present invention tends to acidify basic soils and to alkalize acidic soils, so that the same preparation will render either a basic or an acid soil substantially neutral.

Certain soil conditioners which have been used in the past have also exerted a phytocidal action. Such compounds could not be used on lawn grass or shrubs or in any situation where roots were near the surface. Such conditioners were ordinarily used before the soil was planted, and then the soil permitted to stand for some time before a crop was planted therein. The soil conditioner of the present invention can be freely applied to growing crops or lawns and will not damage the crops.

Another unique feature of the soil conditioner of the present invention is that it releases carbon dioxide when water is applied to soil subsequent to the application of the soil conditioner. The liberated carbon dioxide bubbles through the soil and actually helps till the soil and renders the soil in better physical condition.

The use of the soil conditioner of the present invention is not to be confused with soil amendments based on ferrous sulfate, copperas, which has been the common and accepted source of iron; copperas is relatively poor in the places where the soil conditioner of the present invention is good. Because copperas has not been satisfactory, its use for chlorosis has decreased and it is no longer used in the art for conditioning soils.

In accordance with the present invention, a soil conditioner is provided which consists of a combination of ferric sulfate and calcium carbonate. Although these compounds have been individually used on soils in the past, their use in combination results in the above enumerated unique properties. The soil conditioner of the present invention is preferably made from a mixture of one part of ferric sulfate to three parts of calcium carbonate by weight although proportions as low as one part of ferric sulfate or as high as nine parts of calcium carbonate to equal parts of each may be used under certain conditions. Although it might be suspected that since these substances form gypsum, the effect would be about the same as adding gypsum to the soil, the data herein submitted show that such is not the case and that an effect entirely different from that of gypsum is obtained.

Another unique feature of the present invention is that the soil conditioner is completely non-irritating to the user, despite the fact that it contains a large percentage of ferric sulfate. When ferric sulfate is applied to soil, the dust has been found to be irritating to the user, while the composition of the present invention is not at all unpleasant to use.

In order to demonstrate the effectiveness of the present invention, a number of tests were run using various soil types. The soil types selected were representative of widely contrasting soils and consisted of Hugo Clay Loam, an acidic soil having a normal pH of 5.5; Sorrento Loam, a substantially neutral soil having a pH of 7.1; and Alviso Clay, a very heavy alkaline soil having a pH of 8.5. In making the tests, soil was placed in flats having dimensions of 12" x 12" x 5". Each flat was filled with soil to a level of about 1" below the top. The soil conditioner was then raked into the top ¾" of soil, with a small implement, to simulate field tilling. A measured quantity of water was then applied to each flat in a manner comparable to field flooding. The flats were then set aside until the soil had dried to the proper moisture level for tilling. At this time, various measurements were made to determine the physical and chemical condition of the soil.

The soil was first tested for pH with the following results:

*Table I*

| Soil Series | Material applied | Dosage Ferric Sulfate Equivalent per 100 sq. ft. | Soil pH Before Treatment | Soil pH After Treatment |
|---|---|---|---|---|
| | | lbs. | | |
| Hugo Clay Loam | MV-64[1] | 5 | 5.5 | 6.2 |
| | MV-64 | 10 | 5.5 | 6.1 |
| | Ferric sulfate | 5 | 5.5 | 3.9 |
| | Ferric sulfate | 10 | 5.5 | 3.5 |
| Sorrento Loam | MV-64 | 4 | 7.1 | 7.5 |
| | MV-64 | 20 | 7.1 | 7.6 |
| | Ferric sulfate | 5 | 7.1 | 5.6 |
| | Ferric sulfate | 10 | 7.1 | 4.9 |
| Alviso Clay | MV-64 | 5 | 8.5 | 7.8 |
| | MV-64 | 10 | 8.5 | 7.8 |
| | Ferric Sulfate | 5 | 8.5 | 7.8 |
| | Ferric sulfate | 10 | 8.5 | 7.7 |

[1] MV-64 consists of one part ferric sulfate plus three parts calcium carbonate. This term "MV-64" is a code number, used by the applicant to designate this specific chemical composition.

The soil was also observed for signs of surface cracking, surface hardness, and a measurement was made of the amount of force necessary to force a blunt instrument 3" into the soil. The following results were obtained.

Table II

| Property | Soil Series | None | Fe₂(SO₄)₃ [1] | CaCO₃ [2] | MV-64 [3] |
|---|---|---|---|---|---|
| Surface Cracking | A | 5 | 1 | 5 | 2 |
|  | N | 5 | 1 | 5 | 3 |
|  | B | 5 | 5 | 5 | 5 |
| Surface Hardness | A | 5 | 3 | 5 | 3 |
|  | N | 5 | 2 | 4 | 3 |
|  | B | 5 | 3 | 4 | 4 |
| Penetration lbs. force for 3″ | A | 3.5 | 1.6 | 3.3 | 1.4 |
|  | N | 2.7 | 0.8 | 1.5 | 1.3 |
|  | B | 10+ | 0.9 | 5.8 | 1.9 |

A = Acid soil—Hugo Clay Loam.
N = Neutral soil—Sorrento Loam.
B = Basic soil—Alviso Clay.

METHOD OF RATING

| Surface Cracking | Surface Hardness | Force, lbs. to penetrate 3″ | |
|---|---|---|---|
| 1. No cracking. | 1. Very soft. | 0-1 | Excellent. |
| 2. Light cracking. | 2. Soft. | 1-2 | Good. |
| 3. Moderate cracking. | 3. Medium. | 2-3 | Fair. |
| 4. Heavy cracking. | 4. Hard. | 3-4 | Poor. |
| 5. Very heavy cracking. | 5. Very hard. | Over 4 | Very poor. |

[1] 4 lbs./ft.²
[2] 12 lbs./ft.²
[3] 16 lbs./ft.²

The following tests show the effect of varying the proportions of ferric sulfate and calcium carbonate, as well as the use of gypsum:

Treatment:
No. 1—Untreated.
No. 2—CaCO₃ at 10 lbs./100 square feet.
No. 3—Fe₂(SO₄)₃ at 7 lb./100 sq. ft.
No. 4—90% CaCO₃ + 10% Fe₂(SO₄)₃ at 10 lbs./100 sq. ft.
No. 5—75% CaCO₃ + 25% Fe₂(SO₄)₃ at 10 lbs./100 sq. ft.
No. 6—50% CaCO₃ + 50% Fe₂(SO₄)₃ at 10 lbs./100 sq. ft.
No. 7—Gypsum equivalent to gypsum formed by treatment No. 5.
No. 8—Gypsum at 10 lbs./100 sq. ft.

| | Cracking | | | Hardness | | | Penetration | | | pH | | |
|---|---|---|---|---|---|---|---|---|---|---|---|---|
| | Acid | Basic | Neut. | Acid | Basic | Neut. | Acid | Basic | Neut. | Acid | Basic | Neut. |
| 1 | 5 | 5 | 5 | 5 | 5 | 5 | 3.5 | 10+ | 2.7 | 5.5 | 8.5 | 7.1 |
| 2 | 5 | 5 | 5 | 5 | 4 | 4 | 3.3 | 5.8 | 1.5 | 6.6 | 8.1 | 6.6 |
| 3 | 1 | 5 | 1 | 3 | 3 | 2 | 1.6 | 0.9 | 0.8 | 3.5 | 7.7 | 4.9 |
| 4 | 5 | 5 | 5 | 4 | 4 | 3 | 2.5 | 4.1 | 1.5 | 6.9 | 8.0 | 7.3 |
| 5 | 2 | 5 | 3 | 3 | 4 | 3 | 1.4 | 1.9 | 1.3 | 6.1 | 7.8 | 7.6 |
| 6 | 2 | 5 | 2 | 3 | 3 | 2 | 1.3 | 1.9 | 0.5 | 5.5 | 8.1 | 6.3 |
| 7 | | | 5 | | | 5 | | | 10+ | | | 6.9 |
| 8 | | | 5 | | | 5 | | | 10+ | | | |

In order to demonstrate the superiority of MV-64 over gypsum, tests were run with Sorrento Loam. In the first test, gypsum was added at a rate equal to the gypsum formed by the application of MV-64 at the rate of 10 pounds per 100 square feet, and in the second, gypsum was added at the rate of 10 lbs./100 square feet. The following results were obtained:

| Test | 1 | 2 |
|---|---|---|
| Cracking | 5 | 5 |
| Hardness | 5 | 5 |
| Penetration | 10+ | 10+ |
| pH | 6.92 | |

It is apparent from the above tests that the soil conditioner of the present invention is capable of neutralizing soil, regardless of whether the soil is acid or basic. It is further apparent that surface cracking is materially lessened by using the conditioner of the present invention, and that satisfactory surface softness is also achieved. It is also apparent that gypsum does not achieve the same effect.

Another series of tests was made to determine the safety of using the soil conditioner of the present invention. In this series of tests, the soil was sub-irrigated by placing pots in a shallow pan of water so that it was necessary for the water to move upwardly by capillarity through the soil. Thus, this test was indicative, not only of the safety of the compounds under test, but also of the ability to aid the soil structure. One series of pots was planted with radish, beet and bean seeds, and an application of MV-64 was then made over the surface of the soil at a rate equivalent to one ton of MV-64 per acre. In this test, there was a partial loss of bean seeds, but radish and beet seeds emerged normally. The test was then repeated except that the MV-64 was applied at the same rate and cultivated into the soil just before planting. Under these conditions, there was a complete emergence of all seeds. The test was then repeated using the same amount of ferric sulfate over the soil prior to planting, but omitting the calcium carbonate. Under these conditions, there was a 35% loss of beets, a 35% loss of radishes, and a 14% loss of beans. The test was then repeated except that no soil conditioning agent was used. Under these conditions, there was no emergence of seeds whatsoever since the soil was of such a poor nature that it would not permit sub-irrigation.

In another test, MV-64 was applied to Sorrento Loam soil at a rate of three tons per acre, and was placed directly in furrows before planting Golden Cross Bantam Corn. A similar test was made when an equivalent dosage of ferric sulfate alone was used. In the case of the application of MV-64, the top growth of the corn was increased, while the application of the ferric sulfate alone caused a decrease in growth.

In still another test, MV-64 was applied at the rate of three tons per acre to an established lawn of creeping bent, Astoria bent, blue grass and Bermuda grass, and caused no injury. Application of a ferric sulfate-peat moss mixture at an equivalent rate caused almost immediate blacking and burning of the blades and stems of the grass. MV-64 was also applied to a new lawn of rye grass which was 1½″ to 2″ high, and caused no injury thereto.

The compounds of the present invention can be advantageously applied to soil at a rate of from one-half to four tons per acre, and preferably at the rate of from one to two tons per acre.

The present invention depends upon an unexpected property of the stability of ground ferric sulfate. Ferric sulfate tends to take up water and cake or deliquesce in high humidity. It was thought that the presence of lime would adversely affect the stability of the ferric sulfate and would react with it whereas the reverse is true; MV-64 cakes less and does not react in storage even though no precautions are taken to dry the product more than is common commercial practice.

I claim:

1. A soil treating agent comprising a combination of from 10 to 50 parts of ferric sulfate and from 50 to 90 parts of calcium carbonate, all parts being by weight.

2. As a soil treating agent, a combination of about 75 parts by weight of calcium carbonate to 25 parts by weight of ferric sulfate.

3. The method of treating soil comprising applying to the soil a soil treating agent containing from about 10 to 50 parts of ferric sulfate and from 50 to 90 parts of calcium carbonate, all parts being by weight.

4. The method of treating soil comprising applying to the soil a mixture containing about 25 parts by weight of ferric sulfate and about 75 parts by weight of calcium carbonate.

5. The method of claim 3 wherein the compound is applied at the rate of from one-half to four tons per acre.

6. The method of claim 3 wherein the compound is applied at a rate of from one to two tons per acre.

7. The method of claim 3 wherein the compound is worked into the top soil.

References Cited in the file of this patent

UNITED STATES PATENTS

| | | |
|---|---|---|
| 1,384,990 | Campbell | July 19, 1921 |
| 1,428,633 | Hoffman | Sept. 12, 1922 |
| 2,625,529 | Hedrick | Jan. 13, 1953 |
| 2,702,966 | Boyd | Mar. 1, 1955 |

OTHER REFERENCES

Chemical Abstracts, vol. 21, p. 4194 (1928), article "Reclamation of the Fresno Type Black Alkali Soil."

Mellor: "A Comprehensive Treatise on Inorganic and Theoretical Chemistry," pub. by Longmans, Green & Co. (N. Y.), 1935, reprinted 1947, pp. 323–327.

Chemical Abstracts, vol. 37, col. 1542 (1943), article "Effect of Lime in Coagulation of Sewage."

Lambe et al.: "Altering Soil Properties with Chemicals," Chemical and Engineering News, vol. 32, No. 6, pp. 488–492 (February 8, 1954).